US012704445B2

(12) United States Patent
Affri

(10) Patent No.: US 12,704,445 B2
(45) Date of Patent: Aug. 11, 2026

(54) DUROMETER EQUIPPED WITH A ROTATING HEAD MOUNTED ON A TILTING SYSTEM

(71) Applicant: Renato Affri, Arcisate (IT)

(72) Inventor: Renato Affri, Arcisate (IT)

( * ) Notice: Subject to any disclaimer, the term of this patent is extended or adjusted under 35 U.S.C. 154(b) by 293 days.

(21) Appl. No.: 18/392,269

(22) Filed: Dec. 21, 2023

(65) Prior Publication Data

US 2024/0272056 A1 Aug. 15, 2024

(30) Foreign Application Priority Data

Jan. 2, 2023 (IT) ........................ 102023000000009

(51) Int. Cl.

| | |
|---|---|
| ***G01N 3/42*** | (2006.01) |
| ***G01N 3/06*** | (2006.01) |
| ***G01N 3/46*** | (2006.01) |

(52) U.S. Cl.

CPC ............... *G01N 3/42* (2013.01); *G01N 3/068* (2013.01); *G01N 3/46* (2013.01)

(58) Field of Classification Search

CPC ........ B25J 17/00; B25J 17/02; B25J 17/0208; B25J 17/0216; B25J 17/0225; B25J 17/0233; B25J 17/0241; B25J 17/0258; B25J 17/0266; B25J 17/0275; B25J 17/0283; B25J 17/0291; B25J 18/007; B25J 18/04; B25J 9/06; B25J 9/106; G01N 3/04; G01N 3/068; G01N 3/42–46

See application file for complete search history.

(56) References Cited

U.S. PATENT DOCUMENTS

| | | | | |
|---|---|---|---|---|
| 2,131,369 A * | 9/1938 | Brisson | F16D 65/22 | 188/323 |
| 2,259,840 A * | 10/1941 | Smith | G01N 3/42 | 73/78 |
| 4,657,472 A * | 4/1987 | Zimmer | B25J 17/0291 | 901/29 |
| 4,662,815 A * | 5/1987 | Zimmer | B25J 9/06 | 901/29 |
| 4,736,645 A * | 4/1988 | Zimmer | B25J 17/0291 | 901/26 |
| 4,771,652 A * | 9/1988 | Zimmer | B25J 17/0291 | 901/29 |
| 4,990,050 A * | 2/1991 | Tsuge | B25J 9/06 | 901/29 |
| 2006/0179964 A1* | 8/2006 | Hama | B25J 9/06 | 74/490.05 |
| 2012/0210777 A1 | 8/2012 | Höll | | |
| 2018/0126564 A1* | 5/2018 | Chisena | B25J 17/0291 | |
| 2019/0291268 A1* | 9/2019 | Adachi | B25J 9/0024 | |

FOREIGN PATENT DOCUMENTS

| | | | |
|---|---|---|---|
| JP | 2013019818 A * | 1/2013 | G01N 3/42 |

* cited by examiner

*Primary Examiner* — David L Singer

(74) *Attorney, Agent, or Firm* — Woodard, Emhardt, Henry, Reeves & Wagner, LLP

(57) ABSTRACT

Hardness tester provided with a rotating measuring head, a first rotating device and a second rotating device, wherein the rotating measuring head is secured to the rotating device and is capable of rotating with respect to it, and wherein the first rotating device and the second rotating device are secured to each other and inclined with respect to each other. The hardness tester is equipped with a slide provided with a stroke on which the rotating measuring head is mounted and with a first motor capable of activating the movement of the slide.

9 Claims, 11 Drawing Sheets

DUROMETER EQUIPPED WITH A ROTATING HEAD MOUNTED ON A TILTING SYSTEM

BACKGROUND OF THE INVENTION

The present invention refers to a hardness tester suitable for carrying out three-dimensional hardness tests on large pieces. In particular, the present invention refers to such a hardness tester provided with a movable head mounted on a tilting system. The present invention also refers to a system which includes a portal and such a hardness tester provided with a movable head.

STATE OF THE ART

The hardness tester is a measuring device intended for measuring the hardness of materials. To measure the hardness of a material, the hardness tester performs a penetration to a certain depth, pushing a tip against the material to be tested with a known force. Measuring the depth of penetration or the size of the imprint left on the material gives an indication of the hardness of the material tested.

Nowadays, commercially available hardness testers are equipped with very advanced technology; however, in cases where testing requirements are required on large pieces, such as rings with diameters of approximately 8 meters and heights of approximately 6 meters with weights of up to 200 tons, the hardness testers currently used only partially meet the requirements.

In fact, since the pieces to be measured are of such large dimensions, a single test in correspondence with a portion of the upper surface is not enough, but tests with increasingly greater precision are required in all areas of the piece at every angle, as for example in the case of large ball valves, because a correct hardness could be found on the upper part of the piece but an unacceptable value could be found at half height.

However, these tests are difficult to carry out: in fact, these pieces require flattening on the test point. However, moving these pieces under the hardness tester is not always feasible due to high costs and long moving and storage times.

A characteristic of these measuring pieces is that they have an irregular surface. The surface is usually decarburized and a few millimeters is excavated to reach the truly homogeneous material and to obtain a valid test. These tests are typically carried out by flattening with a manual grinding wheel; however, this causes heating at the test point which can alter the hardness. In addition to considerable operator fatigue, there is also an inaccuracy in the grinding depth.

Currently, portable hardness testers are also used to be able to get closer to the piece to be measured, but this involves a major precision obstacle as 29,436 N of thrust cannot be performed with a portable hardness tester, as there is no reaction point. To overcome this problem, percussion devices are used, which dynamically exert a fairly high load (often not up to standard) or are anchored to the piece to be measured with ropes, chains and brackets, an operation that takes a long time.

A partial solution to the problem is carried out with so-called portal hardness testers, that is, mounted on self-propelled bridges capable of carrying out tests on the top of the pieces. This technique allows us to solve the problem of testing at 29,436 N and surface smoothing; however, excessively large pieces cannot be tested in any case, as it is only possible to perform tests on the top of the pieces while the pieces must be turned to carry out other tests on the sides, and this is not always possible.

US Patent Application No. US 2012/210777 describes a hardness testing device provided with an indenter, arranged on a support, for producing an indentation in an object to be tested and at least one lens for taking at least one size of the indentation in the object under test. The holder is mounted on the hardness tester in such a way that it can rotate around its longitudinal axis.

However, this device does not allow precise measurements when the object to be tested is tested on other planes, for example on an inclined plane.

Therefore, the Applicant of the present patent application has found that it is not possible nowadays to have precise tests relating to the hardness on large and especially inclined pieces.

Therefore, the Applicant of the present patent application has found the need to create a hardness tester that allows solving the technical problems encountered above using the hardness testers currently available on the market.

SUMMARY OF THE INVENTION

In a first aspect, the present invention refers to a hardness tester.

The present invention in fact arises from the general consideration according to which the technical problem detailed above can be solved effectively and reliably by means of a hardness tester equipped with a rotating measuring head capable of rotating around an X axis, of a first revolving rotating device suitable for rotating around a Y axis and a second revolving rotating device suitable for rotating around a Z1 axis.

Said rotating measuring head is secured to said first revolving rotating device and is capable of also rotating around said Y axis of said first revolving rotating device.

Furthermore, said first revolving rotating device and said second revolving rotating device are secured to each other and inclined with respect to each other. In this way, the rotating measuring head is able to move linearly up and down; furthermore, thanks to the variable angles of the Y axis of the first rotating device and the Z1 axis of the second rotating device, the combination of the two angles of the first and second rotating device with respect to the rotating measuring head allows the head to rotate in space with an infinite variety of angles.

It is thus possible to carry out tests both above and along the sides of the pieces to be tested, and also on each inclined point, in practice, with a three-dimensional system.

It is in fact possible to carry out both vertical, horizontal and rotated tests in every angle, thus allowing tests to be performed, for example, on spheres in every angle, ideally also from bottom to top, unlike the hardness tester described in US 2012/210777 where it was possible to carry out only partial measurements along the vertical axis only.

Therefore, in the present invention the rotating head is moved in order to reach any point of the piece to be measured, which instead remains stationary.

In this way, the problem of having to move the pieces to be measured, which are often extremely heavy and bulky, is solved.

According to a preferred embodiment, said first rotating device and said second rotating device are inclined with respect to each other by approximately 45 degrees.

In this way, the rotation of the head in any direction and at any angle is further promoted. According to a preferred embodiment, said rotating measuring head is equipped with a milling device and a hardness system with load cell, also called indenter.

In this way, it is possible to mill the piece to be measured to evaluate its hardness. According to a preferred embodiment, said rotating measuring head is also equipped with a camera for measuring hardness imprints.

In this way, it is possible to display, measure and/or calculate the hardness of the piece to be measured based on the depth of the milling performed.

According to a preferred embodiment, said rotating measuring head is also provided with a first hydraulic expansion brake.

In this way, said first hydraulic expansion brake is able to block the rotation of the head to counterbalance the thrust forces.

According to a preferred embodiment, the hardness tester of the present invention is also provided with a slide equipped with a stroke on which said rotating measuring head is mounted.

In this way, after the rotating head has been rotated by the required inclination, said slide is able to move along the inclined axis. The hardness test is thus carried out at the determined point, or, depending on the needs, milling is carried out and the hardness is measured.

According to a preferred embodiment, the hardness tester of the present invention is also provided with a first motor capable of activating the movement of said slide.

In this way, the first motor is able to allow the hardness tester of the present invention to exert a force of 29,436 N with a known closed-circuit system.

According to a preferred embodiment, the hardness tester of the present invention is also provided with a screw system, preferably a double screw, suitable for engaging with said slide.

According to a preferred embodiment, the hardness tester of the present invention is also provided with at least one guiding system, such as, for example, a ball trolley, suitable for guiding said slide.

In this way, thanks to the presence of the slide, the relative motor that activates the movement of the slide, the guiding system for guiding the slide and the screw system suitable for engaging with the slide, the slide itself is able to slide and move into position to perform the hardness test, together with the rotation rotating devices to tilt the head. According to a preferred embodiment, the hardness tester of the present invention is also equipped with a second motor and a first gear system suitable for operating said first rotating device. According to a preferred embodiment, the hardness tester of the present invention is also provided with a second hydraulic expansion brake.

In this way, once said first rotating device has reached the required position, it is blocked by said second hydraulic expansion brake.

Similarly, according to a preferred embodiment, the hardness tester of the present invention is also equipped with a third motor and a second gear system suitable for operating said second rotating device. According to a preferred embodiment, the hardness tester of the present invention is also provided with a third hydraulic expansion brake.

In this way, once said second rotating device has also reached the required position, it is blocked by said third hydraulic expansion brake.

In a second aspect, the present invention refers to a system.

The present invention in fact arises from the general consideration according to which the technical problem specified above can be solved effectively and reliably by means of a system consisting of a hardness tester as described above with reference to the first aspect of the present invention and a portal, wherein the portal includes:

a basic structure suitable for supporting the piece to be measured using said hardness tester;

a pair of support elements which rise substantially vertically from said base structure;

a connecting element arranged between the two support elements substantially parallel to said base structure and with a length substantially equal to the width of said base structure, wherein said connecting element is capable of sliding upwards and/or downwards along said support elements;

at least one guide obtained in said connecting element suitable to allow a portion of said hardness tester to attach to, and slide along, said at least one guide following the rotation of said rotating measuring head.

In this way, the hardness tester applied to the portal can be oriented in any direction and at any angle during the measurement test of any object to be tested, positioned on the base structure of the portal.

In a third aspect, the present invention refers to a system.

The present invention in fact arises from the general consideration according to which the technical problem specified above can be solved effectively and reliably by means of a system consisting of a hardness tester as described above with reference to the first aspect of the present invention and a semi-portal including:

a basic structure suitable for supporting the piece to be measured with said hardness tester;

a support element rising substantially vertically from said base structure;

a connecting element arranged substantially perpendicular to said support element and secured at one end thereof to a portion of the block including said rotating measuring head, wherein said connecting element is capable of sliding towards up and/or downwards along said support element and to slide laterally along said base together with said support element.

In this way, the rotating head can be secured to a semi-portal, rather than to a portal as listed above with reference to the second embodiment of the present invention.

With these movements it is possible to move the rotating measuring head, which can be inclined according to any angle to be able to carry out the measurement test, making the measurement carried out more effective.

Further characteristics and advantages of the present invention will be better highlighted by examining the following detailed description of various preferred, but not exclusive, embodiments, illustrated for indicative and non-limiting purposes, with the support of the attached drawings.

DETAILED DESCRIPTION OF THE DISCLOSURE

With reference to FIGS. 1 to 5, an embodiment of a hardness tester 1 of the present invention is shown.

Figure 1:
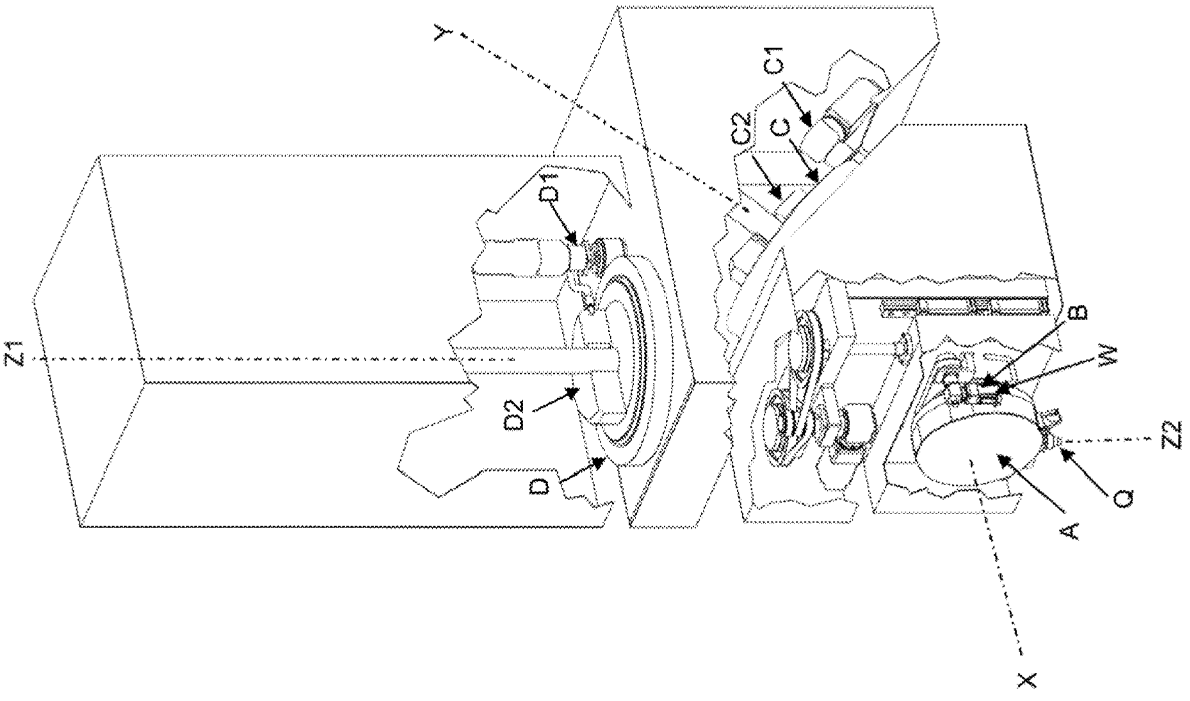
FIG. 1 shows an embodiment of a hardness tester according to the present invention.

FIG. 1 shows the hardness tester 1, equipped with a rotating measuring head A to carry out measurements of the hardness of a piece (such as the one indicated with 4 in FIGS. 6-8), of a first rotating device C, inclined by approximately 45° with respect to the rotating measuring head A, and of a second rotating device D, inclined by approximately 45° compared to the first rotating device C.

The rotating measuring head A is able to rotate around the X axis via the motor W, and is secured to the first rotating device C, being capable of rotating around the Y axis.

The rotating measuring head A is also able to rotate with respect to the first rotating device C.

The second rotating device D is adapted to rotate around a Z1 axis, and the first rotating device C and the second rotating device D are secured to each other and inclined to each other by approximately 45 degrees.

Figure 3:
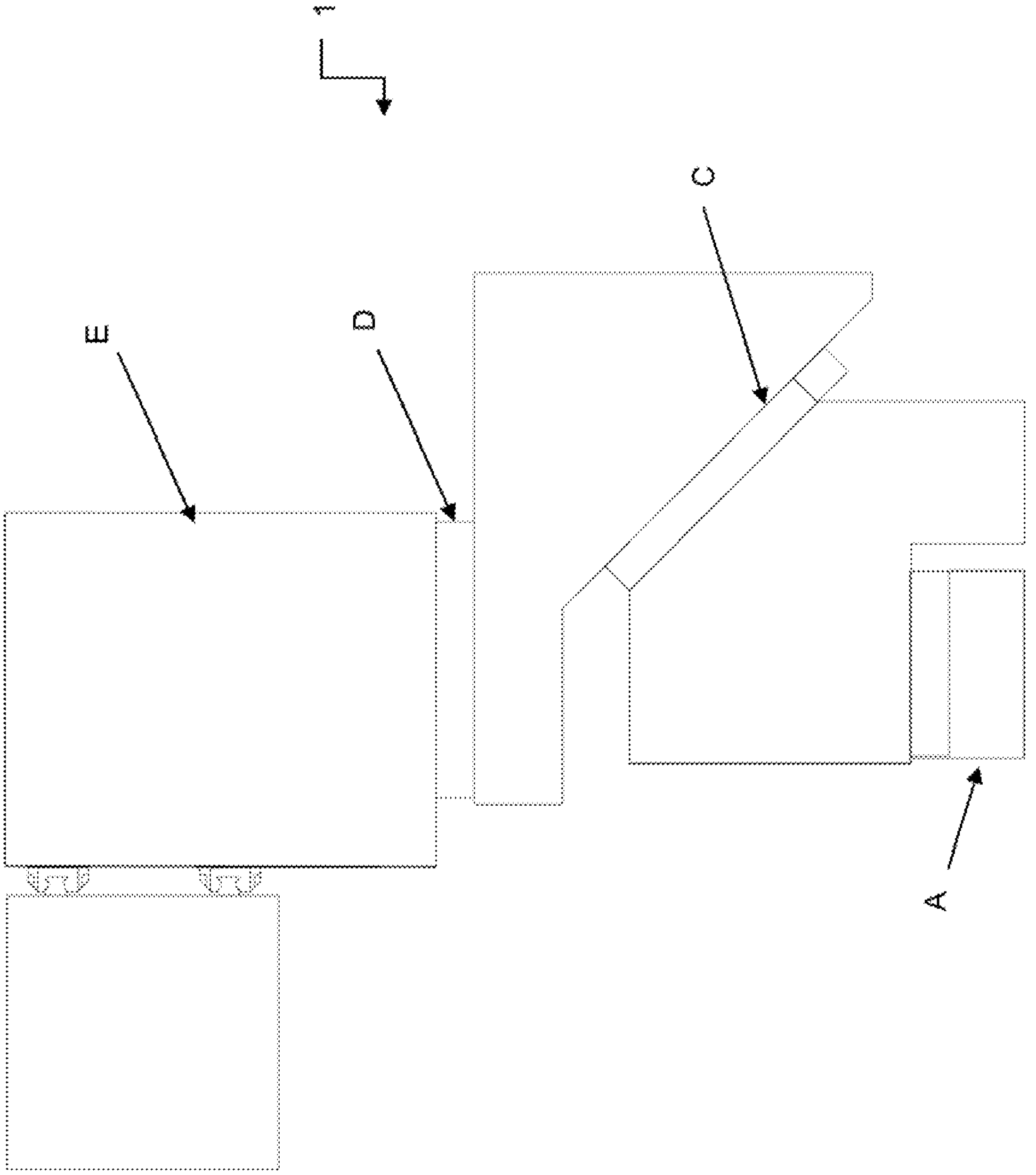
FIGS. 3-5 show various lateral views of the hardness tester of FIG. 1 in corresponding phases during the rotation of the head.
Figure 4:
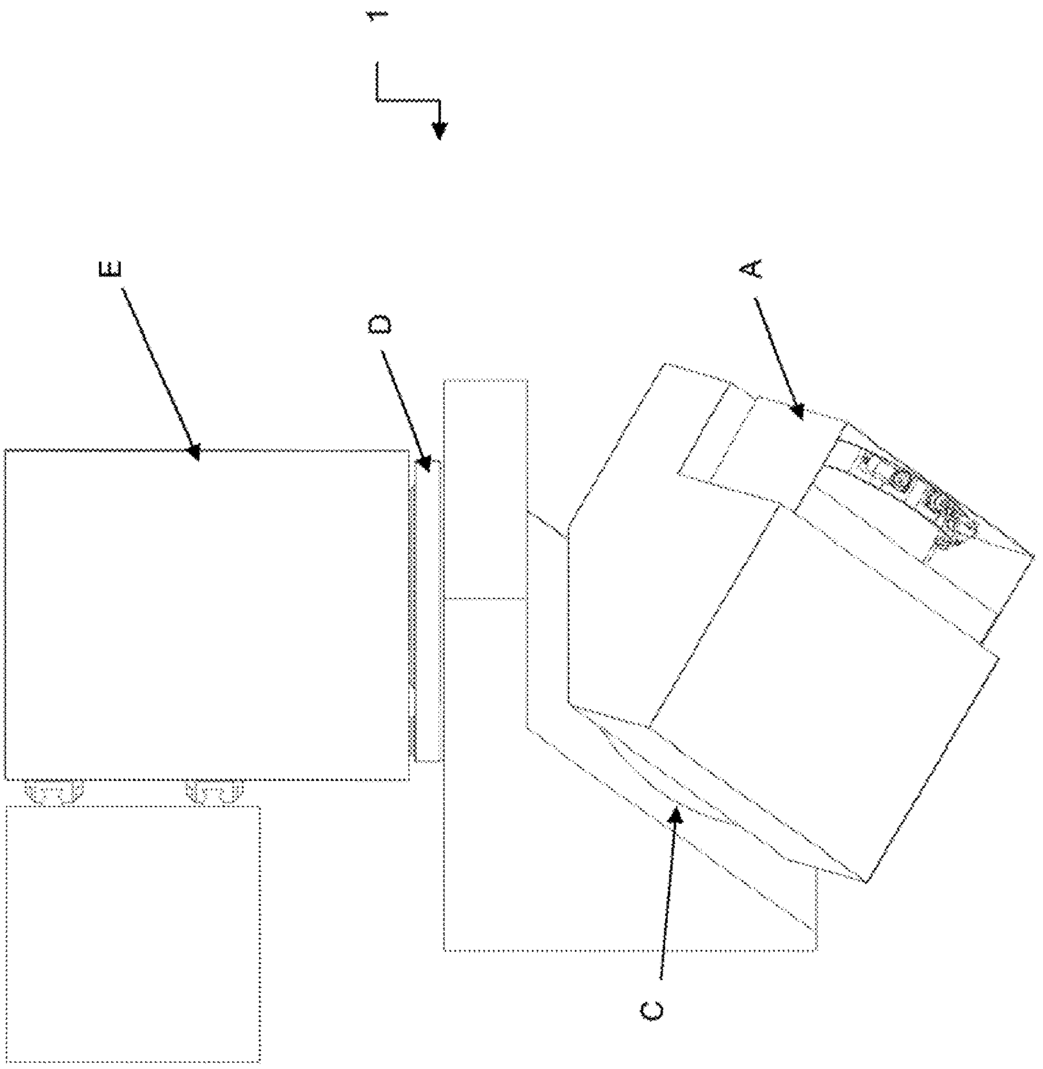
Figure 5:
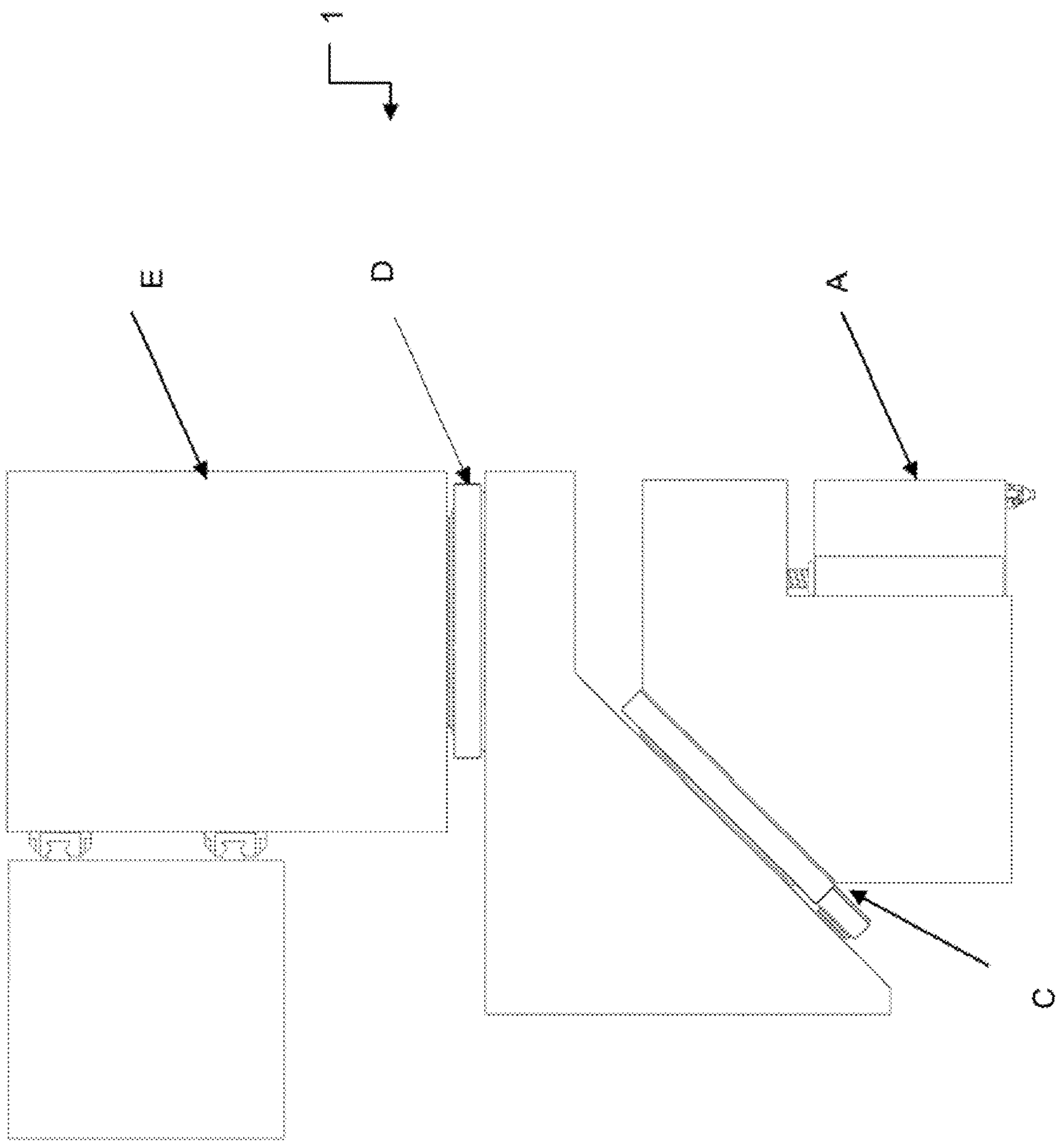

The Y axis around which the first revolving device C rotates, preferentially inclined by 45 degrees, rotates the entire group of hardness tester 1 as indicated in FIGS. 3-5 below, while the Z2 axis, usually vertical, will rotate all and the two groups below; in particular it will rotate the head A in space through the rotating device C and the rotating device D in turn in space.

Figure 2:
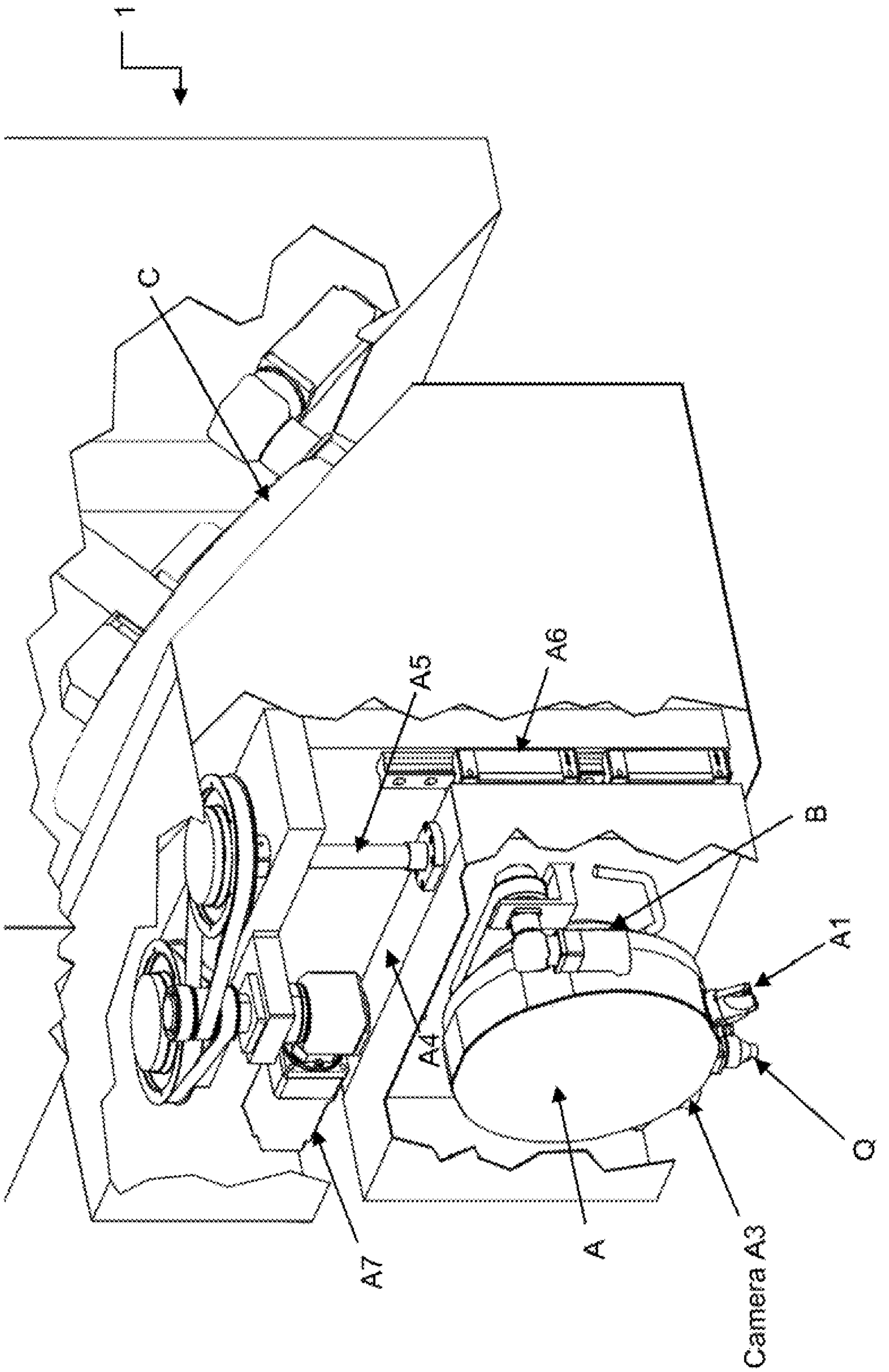
FIG. 2 shows a detail of FIG. 1, wherein the head of the hardness tester is visible.

As shown in detail in FIG. 2, the rotating head A is equipped with a milling device A1, a hardness system with load cell Q (or indenter), and a camera A3 for measuring hardness imprints. The rotating head A is also equipped with a first hydraulic expansion brake B. The hardness indenter Q will always rotate along the X axis around which the rotating head A rotates, but will never rotate along its vertical axis Z2.

The rotating head A is mounted on a slide A4 equipped with a stroke, activated by a first motor A7, exerting a force of 29,436 N with a known closed-circuit system. A double screw system A5 moves the slide A4, guided with ball carriages A6.

The entire rotating head assembly A is mounted on the rotating device C, inclined at 45 degrees, and driven by a motor W and a gear system C1. Once in position, it is blocked with a second hydraulic expansion brake C2 (FIG. 1).

The group consisting of the rotating head A and the first rotating device C is then mounted on the second rotating device D, flat, and therefore inclined in turn by 45° with respect to the rotating device C. The second rotating device D is also driven by a motor and by a gear system D1. Once in position, it is blocked with a third hydraulic expansion brake D2 (FIG. 1).

At this point, after having rotated the rotating head A by the required inclination, the slide A4 will move along the inclined axis and carry out the hardness test or, if required, it will carry out the milling using the milling device A1, and the hardness with the load cell Q (or indenter), including measurement via the camera A3.

In this way, thanks to the presence of the slide A4, of the relative A7 motor activating the movement of the slide A4, of the ball carriages A6 to guide the slide A4 and of the double screw system A5 suitable for engaging with the slide A4, the slide A4 itself is able to slide and move into position, together with the rotating devices C and D, to carry out the hardness test. During this hardness test, all other movement axes indicated in the figures are locked in position.

In this way, it is possible to follow the hardness tests at any point of the piece to be measured, rotating the rotating head A at any angle, thus allowing tests to be carried out on balls at any angle, ideally also from bottom to top.

FIGS. 3-5 show the entire group of hardness tester 1 (consisting of the rotating head A, the first rotating device C and the second rotating device D) in various phases during the rotation of the rotating head A. As can be seen, thanks to the configuration of the hardness tester and by positioning the rotating devices C and D between them and with respect to the rotating head A, it is possible to move the rotating head A to any useful position to carry out an effective measurement of the hardness of the piece to be tested.

The hardness tester 1 in its entirety (rotating head A, first rotating device C, second rotating device D) can be mounted on a portal 2 (shown in FIGS. 6-8) including: a) a base structure 3 suitable for supporting the piece to be measured 4 using the hardness tester 1; b) a pair of support elements 5*a*,5*b* rising substantially vertically from the base structure 3, in correspondence with the opposite ends of the base structure 3 itself; c) a connection element 6 arranged between the two support elements 5*a*, 5*b* substantially parallel to the base structure 3 and with a length substantially equal to the width of the base structure 3. The connecting element 6 is able to slide upwards and/or downwards along said support elements 5*a*,5*b* and is provided with guides 7 suitable to allow a portion E of the group including the second rotating device D of the hardness tester 1 to attach to them. In this way, the entire group of hardness tester 1 is secured to the guides 7 of the connecting element 6 of the portal 2 through the portion E and is able to slide along the guides themselves 7 following the rotation of the rotating head A of the hardness tester 1.

Figure 6:
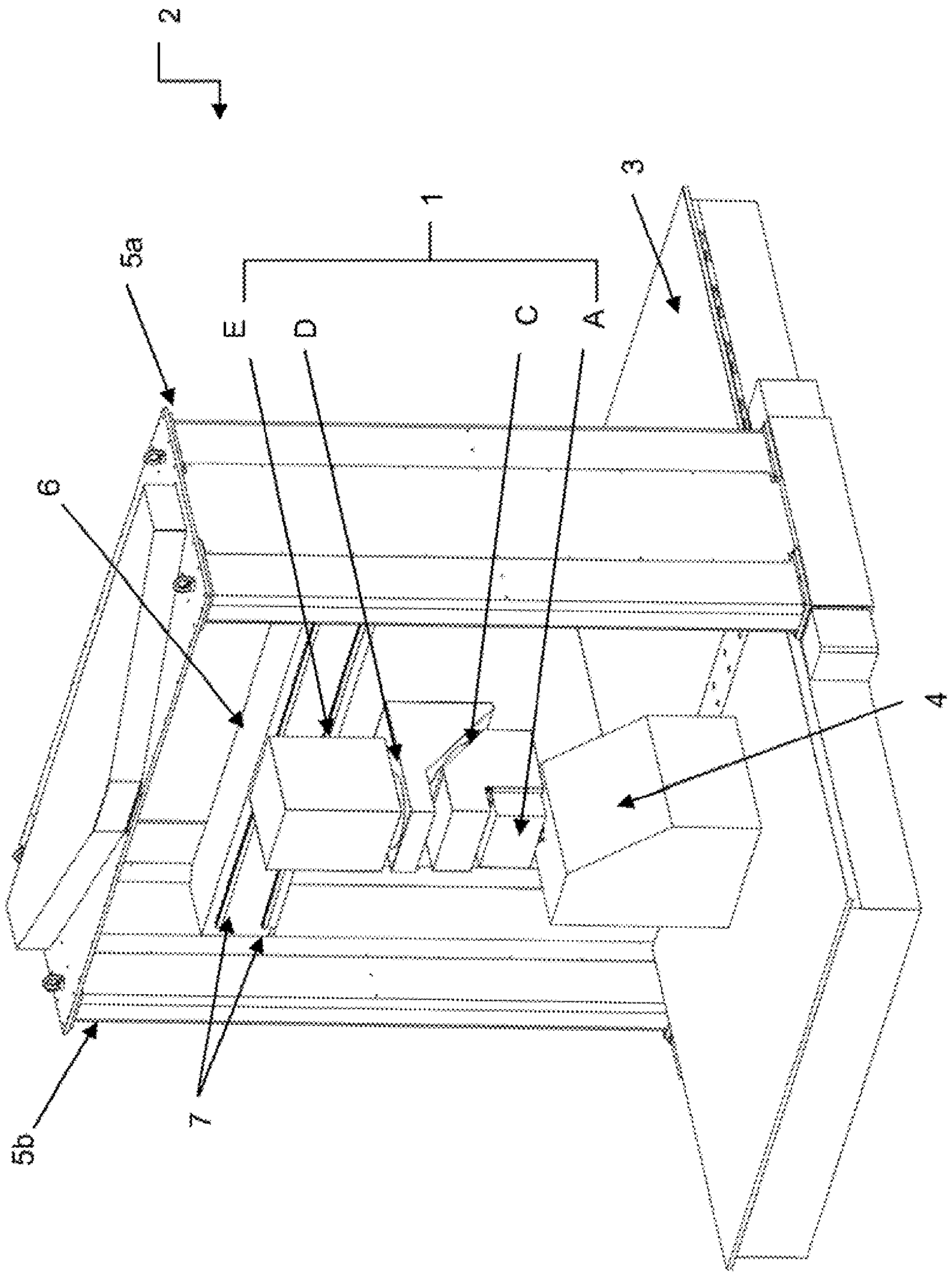
FIGS. 6-8 show various side views of a system of the present invention including a portal and the hardness tester shown in the corresponding FIGS. 3-5 during the rotation of the head.
Figure 7:
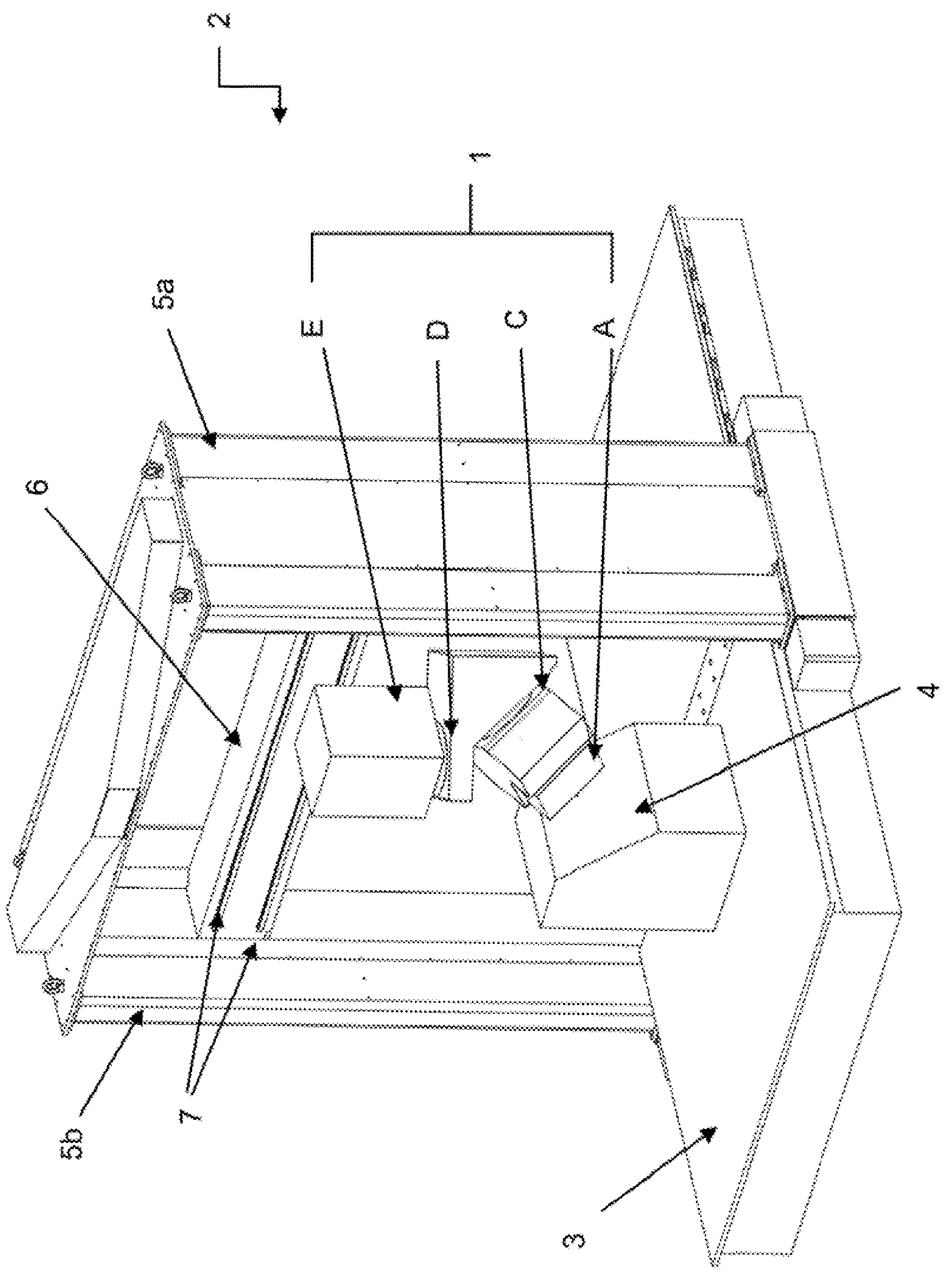
Figure 8:
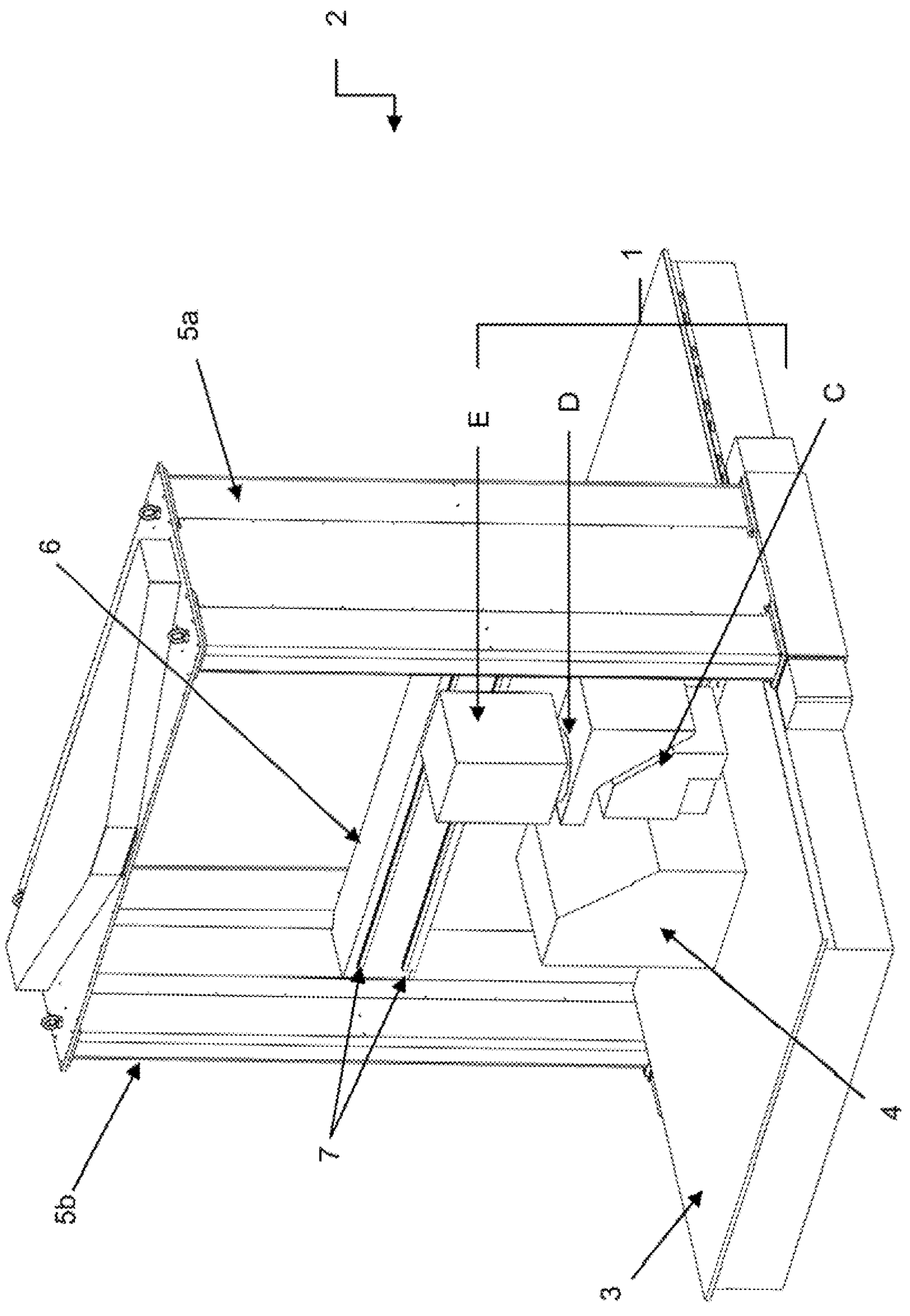

FIGS. 6-8 show the various phases of the measurement procedure of the piece 4 using the hardness tester 1 secured to the portal 2.

In particular, in FIG. 6, the rotating head A of the hardness tester 1 is positioned above the piece 4 to be measured and the connecting element 6, to whose guides 7 the block E is secured including the second rotating device D of the hardness tester 1, is in its highest position. Consequently, the hardness tester 1 in FIG. 6 essentially assumes the same position shown in FIG. 3 (where the hardness tester 1 is detached from the portal 2 of FIG. 6).

In FIG. 7, the rotating head A of the hardness tester 1 has rotated with respect to the first rotating device C; following this rotation, the rotating head A is positioned in front of a lateral surface of the piece 4 to be measured; the connecting element 6 is in a lower position compared to the position described above with reference to the phase shown in FIG. 6, and the block E of the hardness tester including the second rotating device D has undergone a sliding (to the right looking at the opposite figure) along the guides 7 of the connecting element 6. Consequently, the hardness tester 1 in FIG. 7 essentially assumes the same position shown in FIG. 4 (where the hardness tester 1 is detached from the portal 2 of FIG. 7).

Finally, in FIG. 8, the rotating head A of the hardness tester 1 has completed its rotation with respect to the first rotating device C and is now positioned in front of the lower part of the lateral surface of the piece 4 to be measured; the connecting element 6 has substantially reached the lowest position that can be reached, and the block E of the hardness tester including the second rotating device D has substantially completed its sliding to the right (looking at the opposite figure), along the guides 7 of the connecting element 6. Consequently, the hardness tester 1 in FIG. 8 essentially assumes the same position shown in FIG. 5 (where the hardness tester 1 is detached from the portal 2 of FIG. 8).

In this way, it is possible to carry out tests at any point of the piece 4 to be measured, both above and along the sides of the piece to be tested 4, and also on each inclined point, in practice, with a three-dimensional system.

Furthermore, in the present invention the rotating head A of the hardness tester 1 is moved so as to reach any point of the piece 4 to be measured, remaining instead stationary. This solves the problem of having to move the pieces to be measured 4, which are often extremely heavy and bulky and therefore very difficult to move.

Figure 9:
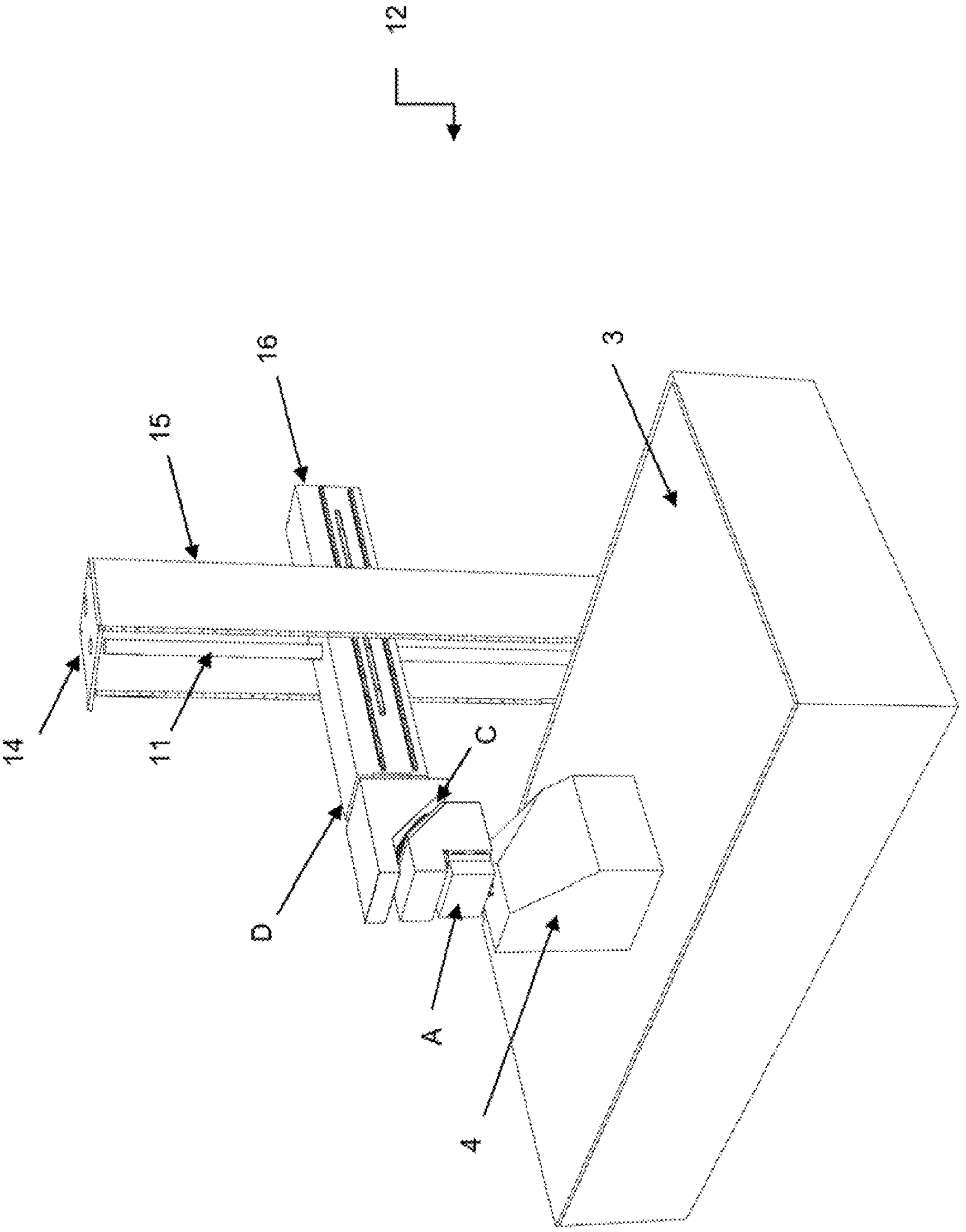
FIGS. 9-11 show various side views of a system of the present invention including a semi-portal and the hardness tester shown in the corresponding FIGS. 3-5 during the rotation of the head.
Figure 10:
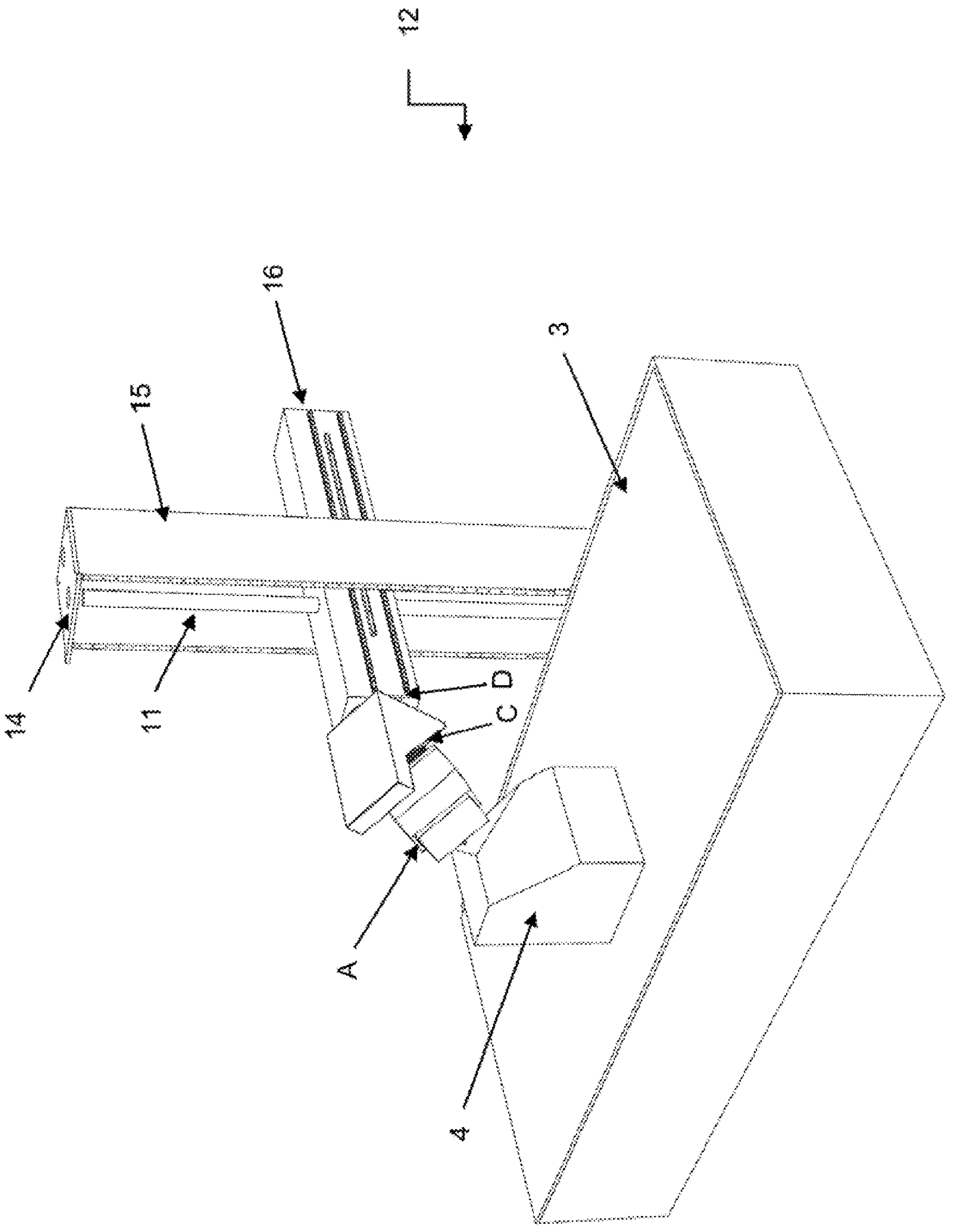
Figure 11:
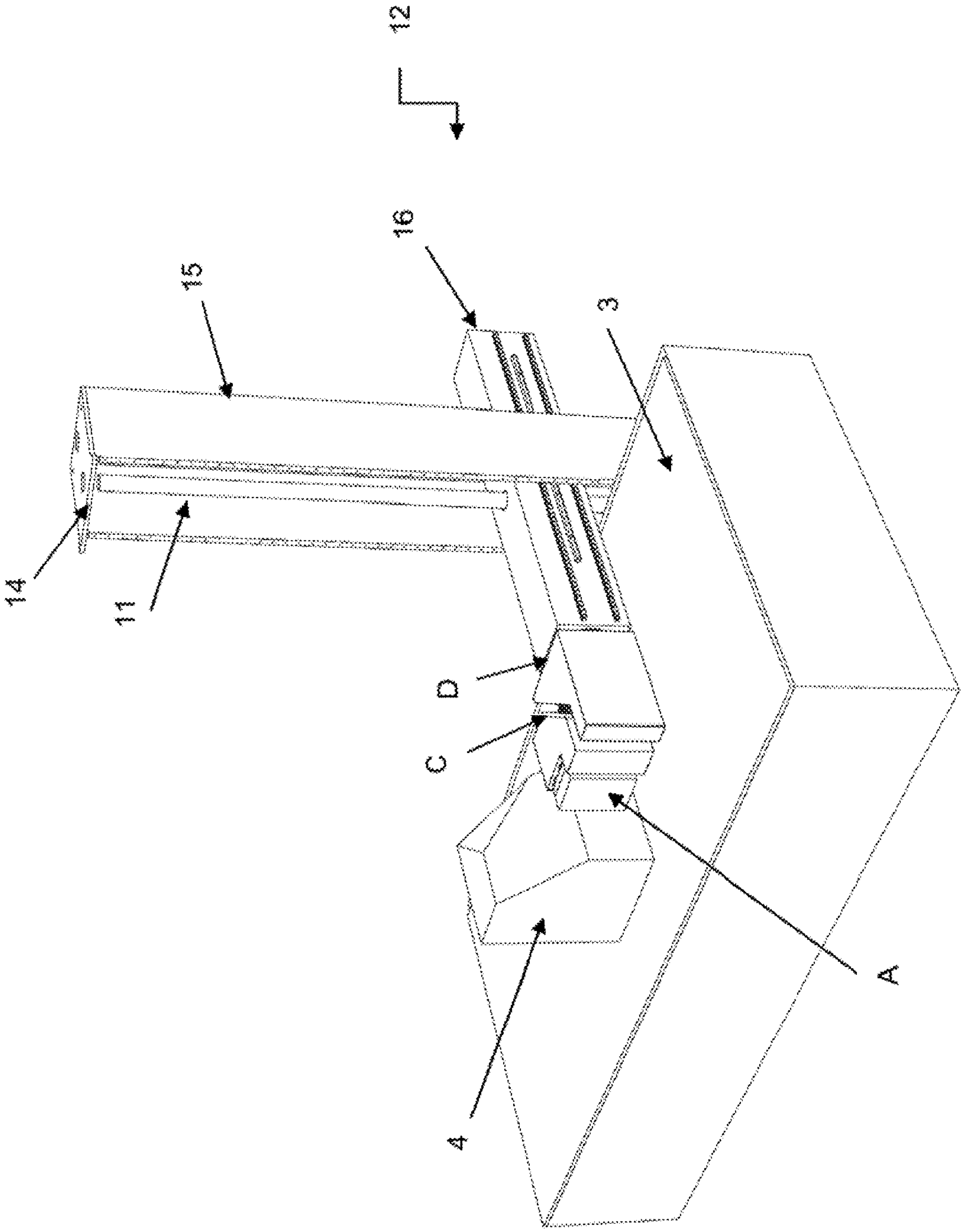

The hardness tester 1 in its entirety (rotating head A, first rotating device C, second rotating device D) can also be mounted on a semi-portal 12 (shown in FIGS. 9-11).

The semi-portal 12 shown in FIGS. 9-11 differs from the portal 2 shown in FIGS. 6-8 mainly in that it has only one support element 15 (instead of two) rising substantially vertically from the base structure 3 on which piece 4 to be measured is positioned.

The connecting element (or crosspiece) 16 is secured to the support element (or supporting element) 15, perpendicular to it, at one end of which the block including the rotating head A is secured.

The supporting element 15 is substantially parallelepiped in shape, with a lateral opening to allow the insertion of the crosspiece 16 into it.

Furthermore, the supporting element 15 is provided with a screw 11 and a relative movement motor mounted in position 14, capable of lowering and raising the crosspiece assembly 16 along the supporting element 15.

Furthermore, the supporting element 15 moves laterally to the right and left with respect to the base 3 with a system of screws, ball guides and relative motor (not indicated in the figures). Consequently, the crosspiece 16, secured to the supporting element 15, also moves back and forth with respect to the base 3.

With these movements, it is possible to move the rotating measuring head A, which can be inclined according to any angle to be able to carry out the test with the stroke of the slide A4, making the measurement carried out more effective.

Similarly, to what was seen in FIGS. 6-8 referring to the portal 2, FIGS. 9-11 show the various phases of the measurement procedure of the piece 4 using the hardness tester 1 secured to the semi-portal 12.

In particular, in FIG. 9, the rotating head A of the hardness tester 1 is positioned above the piece 4 to be measured and the connecting element 16, to which the entire block of the rotating head A of the hardness tester 1 is secured, is in its highest position.

In FIG. 10, the rotating head A of the hardness tester 1 has performed a rotation with respect to the first rotating device C, consequently also determining the rotation of the second rotating device D. The rotating head A is now positioned in front of a lateral surface of the piece 4 to measure; the connecting element 16 is in a lower position compared to the position described above with reference to the phase shown in FIG. 9. Finally, in FIG. 11, the rotating head A of the hardness tester 1 has completed its rotation with respect to the first rotating device C (and with it also the second rotating device D). The rotating head A is now positioned in front of the lower part of the lateral surface of the piece 4 to be measured and the connecting element 16 has essentially reached the lowest position that can be reached.

In this way, with the rotating head A connected to the semi-portal 12, it is possible to carry out tests at any point of the piece 4 to be measured, both above and along the sides of the piece to be tested 4, and also on any inclined point, in practice, with a three-dimensional system.

Also, in this case, as in the one seen above referring to the portal 2 shown in FIGS. 6-8, the rotating head A of the hardness tester 1 is moved so as to reach any point of the piece 4 to be measured, remaining instead stationary.

Of course, many modifications and variations of the preferred embodiments described will be apparent to those skilled in the art, while still remaining within the scope of the invention.

Therefore, the present invention is not limited to the preferred embodiments described, explained for illustrative and non-limiting purposes only, but is defined by the claims that follow.

The invention claimed is:

1. A hardness tester (1) equipped with a rotating measuring head (A) suitable for rotating around an X-axis, with a first rotating device (C) suitable for rotating around a Y-axis and with a second rotating device (D) adapted to rotate around a Z1-axis, wherein said rotating measuring head (A) is also able to rotate around said Y-axis of said first rotating device (C), wherein said first rotating device (C) and said second rotating device (D) are secured to each other and inclined with respect to each other;

wherein said hardness tester (1) is also provided with a slide4 (A4) equipped with a stroke on which said rotating measuring head (A) is mounted and with as first motor (A7) capable of.

2. A hardness tester (1) according to claim 1, wherein said first rotating device (C) and said second rotating device (D) are inclined with respect to each other by approximately 45 degrees.

3. A hardness tester (1) according to claim 1 also provided with a screw system capable of engaging with said slide (A4) and with at least one ball carriage (A6) capable of guiding said slide (A4).

4. A hardness tester (1) according to claim 1, wherein said rotating measuring head (A) is provided with a milling device (A1) and a hardness system with load cell or indenter (Q).

5. A hardness tester (1) according to claim 1, wherein said rotating measuring head (A) is further provided with a camera (A3) for measuring hardness imprints.

6. A hardness tester (1) according to claim 1, wherein said rotating measuring head (A) is further provided with a first hydraulic expansion brake (B).

7. A hardness tester (1) according to claim 1, furthermore provided with a second hydraulic expansion brake (C2) suitable for blocking said first rotating device (C) and a third hydraulic expansion brake (D2) suitable for blocking said second rotating device (D).

8. A system consisting of a hardness tester (1) according to claim 1 and a portal (2), wherein said portal (2) comprises:

a base structure (3) suitable for supporting the piece to be measured (4) with said hardness tester (1);

a pair of support elements (5*a*,5*b*) rising substantially vertically from said base structure (3);

a connection element (6) arranged between the two support elements (5*a*,5*b*) substantially parallel to said base structure (3) and with a length substantially equal to the width of said base structure (3), wherein said connecting element (6) is able to slide upwards and/or downwards along said support elements (5*a*,5*b*);

at least one guide (7) obtained in said connecting element (6) suitable to allow a portion (E) of said hardness tester (1) to attach to, and slide along, said at least one guide (7) following the rotation of said rotating measuring head (A).

9. A system consisting of a hardness tester (1) according to claim 1 and a semi-portal (12), wherein said hardness tester (1) comprises a block which includes the rotating measuring head (A), said semi-portal (12) comprises:

a base structure (3) suitable for supporting the piece to be measured (4) with said hardness tester (1);

a support element (15) rising substantially vertically from said base structure (3);

a connecting element (16), arranged substantially perpendicular to said support element (15) and secured at one end to a portion of said block including said rotating measuring head (A), wherein said connecting element (16) is able to slide upwards and/or downwards along said support (15) and to slide back and forth laterally along said base (3) together with said support element (15).

* * * * *